(12) United States Patent
Dukart

(10) Patent No.: US 8,535,112 B2
(45) Date of Patent: Sep. 17, 2013

(54) MODULAR BOX TURKEY CALL

(76) Inventor: Michael Dukart, Rochester, MN (US)

( * ) Notice: Subject to any disclaimer, the term of this patent is extended or adjusted under 35 U.S.C. 154(b) by 244 days.

(21) Appl. No.: 12/930,533

(22) Filed: Jan. 10, 2011

(65) Prior Publication Data

US 2011/0171877 A1   Jul. 14, 2011

Related U.S. Application Data

(60) Provisional application No. 61/335,710, filed on Jan. 11, 2010.

(51) Int. Cl.
*A63H 5/00* (2006.01)

(52) U.S. Cl.
USPC .......................................... 446/397; 446/418

(58) Field of Classification Search
USPC .................................. 446/397, 418
See application file for complete search history.

(56) References Cited

U.S. PATENT DOCUMENTS

| | | | | |
|---|---|---|---|---|
| 574,534 | A * | 1/1897 | Gibson | 446/397 |
| 1,449,756 | A * | 3/1923 | Jackson | 446/397 |
| 2,511,403 | A * | 6/1950 | Fleener | 446/397 |
| 3,100,948 | A * | 8/1963 | Tax | 446/397 |
| 3,793,767 | A * | 2/1974 | Pulley | 446/397 |
| 4,343,108 | A * | 8/1982 | Lee | 446/397 |
| 4,422,262 | A * | 12/1983 | Moss | 446/397 |
| 4,527,985 | A * | 7/1985 | Zoschg et al. | 446/397 |
| 4,664,641 | A * | 5/1987 | Hearn et al. | 446/397 |
| 4,846,753 | A * | 7/1989 | Langston | 446/397 |
| 4,932,920 | A * | 6/1990 | Hearn | 446/397 |
| 4,941,858 | A * | 7/1990 | Adams | 446/397 |
| 5,484,319 | A * | 1/1996 | Battey | 446/397 |
| 5,830,036 | A * | 11/1998 | Richardson | 446/397 |
| 6,149,493 | A * | 11/2000 | Long | 446/397 |
| 6,168,493 | B1 * | 1/2001 | Kirby | 446/418 |
| 6,669,528 | B2 * | 12/2003 | Kaelin | 446/397 |
| 6,942,539 | B1 * | 9/2005 | Kirby | 446/397 |
| 7,347,762 | B1 * | 3/2008 | Long | 446/418 |
| 7,770,258 | B2 * | 8/2010 | Rozkowski | 16/2.1 |
| 8,142,253 | B2 * | 3/2012 | Peel | 446/397 |
| 2006/0252341 | A1* | 11/2006 | Olinde | 446/397 |
| 2007/0184752 | A1* | 8/2007 | Zearing | 446/418 |
| 2008/0020674 | A1* | 1/2008 | Olinde | 446/397 |
| 2011/0097970 | A1* | 4/2011 | Wyant | 446/418 |

* cited by examiner

*Primary Examiner* — Gene Kim
*Assistant Examiner* — Urszula M Cegielnik
(74) *Attorney, Agent, or Firm* — D L Tschida

(57) ABSTRACT

A game call having a box piece and a striker piece that contacts and vibrates an exposed edge of at least one box wall to produce sound. The box includes a bottom wall and a plurality of side and end walls that circumscribe an open-sided sound chamber. An appendage or striker pivot post projects from the box and supports a resilient assembly to bias the striker to the pivot post. The striker includes a slotted keyway having an aperture, a channel way and an adjoining recess that supports the pivotal movement of the striker. Striker pieces constructed to various shapes and from a variety of materials and having one or more keyways or deformable retainer assemblies are shown that can be interchanged with the box piece to produce a variety of different sounds.

10 Claims, 5 Drawing Sheets

MODULAR BOX TURKEY CALL

RELATED U.S. APPLICATION DATA

Provisional application No. 61/335,710 filed on Jan. 11, 2010.

BACKGROUND OF THE INVENTION

The present invention relates to animal calls and in particular to a box type game call such as used to coax turkeys into shooting range and having an interchangeable striker or paddle.

A call of the foregoing type is shown at U.S. Pat. No. 6,168,493. The call provides a box base piece that pivotally supports a striker that is permanently mounted to the box piece. Several adjoining recesses and interconnecting passageways cooperate with a pivot post to permit movement of the striker relative to the box piece. The angle between the striker and a sound board or peripheral edge of the box piece can thereby be changed to produce different sounds from the single striker.

The subject invention in contrast to the known art provides a box type turkey call that is adapted to interchangeably accept strikers or paddles of different materials, shapes and constructions. A variety of different sounds can thereby be produced from a single box piece and assembly that accommodates different weather conditions with a single call.

In one construction a pivot post is supported from a box or base piece of the call. A paddle or striker that cooperates with the box piece includes a slotted keyway shaped to mount over the pivot post and permit movement of the striker relative to the post to interchangeably support the striker to the box piece. A countersunk bore communicating with the keyway captures and supports the pivot post. A spring and washer resiliently bias the striker during manipulation of the striker over a sound producing surface of the box piece (i.e. a sound board defined by a peripheral edge of the box piece).

In another call construction, a resilient deformable bushing is mounted to the striker. The bushing flexes to permit attaching and detaching the striker from the box piece as desired. The bushing includes deformable projections that flex bi-directionally to interchangeably secure the striker to the pivot post.

In yet another construction a bushing having a moveable clip retainer is mounted to the striker. A collar piece at the retainer is shaped to mate with the striker post and interchangeably engage and disengage from the striker pivot post.

SUMMARY OF THE INVENTION

It is a primary object of the present invention to provide an animal call that accepts an interchangeable striker whereby different sounds can be produced by a single call with different strikers under a variety of environmental conditions.

It is a further object of the invention to provide an animal call that is adapted to support a number of portable strikers of different shapes and compositions without removing a supporting striker pivot post.

It is a further object of the invention to provide interchangeable strikers having at least one slotted keyway wherein an aperture is sized to mount over the head of a fastener that serves as a striker pivot post and is coupled via a slot to an adjoining recess wherein the fastener head nests.

It is a further object of the invention to provide an interchangeable game call striker having a plurality of keyway apertures wherein each aperture is sized to mount over the head of a fastener and communicate via a passageway with an adjoining recess wherein the fastener head nests, whereby the striker can be re-positioned relative to a sound board.

It is a further object of the invention to provide an interchangeable game call striker containing a slotted keyway wherein the striker is resiliently supported to a fastener having a head that nests in a recess of the keyway.

It is a further object of the invention to provide an interchangeable game call striker containing a deformable bushing having a cooperating retainer piece (e.g. deformable bore appendage, bore flange or a cooperating clip retainer) that secures the striker to the striker pivot post.

It is a further object of the invention to provide a box game call having a plurality of co-joined walls that each project from a bottom wall to an upper terminal edge and that collectively circumscribe an open cavity and wherein a pivot assembly projects from one wall to resiliently bias and support a striker that pivots about the fastener and contacts an exposed surface of a sound board wall to replicate animal sounds.

The foregoing objects, advantages and distinctions of the invention, among others, are found in one presently preferred handheld game call construction. The call provides a box portion that resiliently and pivotally supports a striker. The striker is mounted to contact and vibrate an exposed edge of at least one box wall to produce sound. The box includes a bottom wall from which a plurality of side and end walls project to circumscribe an open sided space or recessed sound chamber.

The exterior surfaces of the walls are shaped to facilitate gripping by the hand (e.g. longitudinal grooves, bowed regions and/or other shaped regions). Exposed upper edges of longitudinal sidewalls of the box are shaped and constructed to vibrate as the striker contacts and is manipulated along the edge surface. The box can be constructed of wood, plastic, composites or a variety of materials. The side and bottom walls can be joined or molded as an integral assembly.

An appendage or striker pivot post projects from an end wall. A fastener (e.g. threaded screw) having a flanged or projecting head that radiates beyond a shank of lesser diameter serves as the striker pivot post and a spring and washer are secured about the shank to resiliently bias the striker.

The striker includes a slotted keyway having an aperture sized to mount over the head of the screw fastener. A channel or passageway couples the aperture to a recess or region that supports the fastener to prevent further movement, except pivotal movement of the striker to produce sound. Upon inserting a fastener head through the aperture and depressing the spring and washer, the shank of the fastener is directed along the channel way to align the fastener head piece with the adjoining recess. The spring and washer bias the striker to nest the fastener head into the recess. The striker can thereby be replaced or changed without requiring removal of the fastener.

A variety of other strikers constructed to various shapes and from a variety of materials and having one or more keyways or deformable retainer assemblies can be interchanged with the box piece to produce a variety of different sounds. The strikers can be constructed of wood, plastic, composites or contain laminates whereby different frictional properties and sounds relative to the flexible box piece sound board surfaces can be obtained. Different arcuate contours at the striker and/or box piece contact surfaces can be adapted to the strikers and box piece to produce alternative sounds. The box and striker materials can be adapted to wet or dry conditions.

In alternative constructions, bushings can be fitted to the striker in lieu of or in combination with a slotted keyway to interlock with the pivot post. A bore of the bushing is sized to accept the flanged post head and one or more retainer surfaces or projections (e.g. annular flanges) can radially extend into the bore to capture the striker to the pivot post. A clip retainer having a collar piece can alternatively couple to the bushing to retain the striker. The bushing material and/or cooperating retainers are shaped to be sufficiently resilient to deflect to accept and release from the pivot post to facilitate striker interchangeability.

Still other objects, advantages and distinctions of the invention will become more apparent from the following description with respect to the appended drawings. Considered alternative assemblies, methodologies, improvements and/or modifications are described as appropriate. Individual features of the invention can also be adapted in different combinations in other calls. The description should therefore not be literally construed in limitation of the invention. Rather, the scope of the invention should be broadly interpreted within the scope of the further appended claims.

BRIEF DESCRIPTION OF THE DRAWINGS

Similar reference numerals and characters at the drawings refer to like structure at the various drawings and which are as follows.

DESCRIPTION OF THE PREFERRED EMBODIMENT

Figure 1:
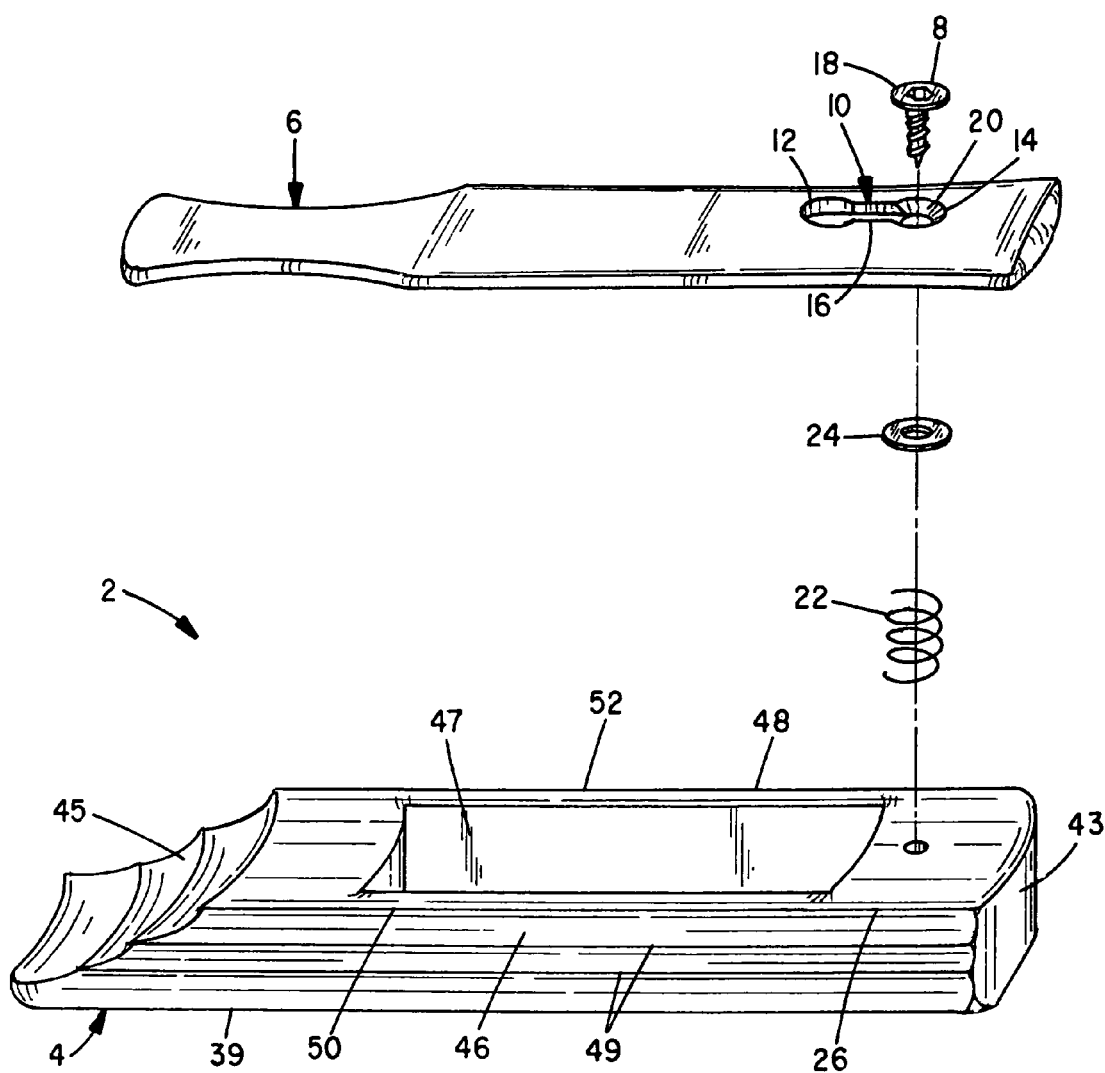
FIG. 1 shows a perspective view in exploded assembly of a box call of the invention wherein an interchangeable striker includes a keyway having a bore, channel way and countersunk recess and which keyway that can be adapted in strikers or paddles of different materials, shapes and profiles.

With attention to FIG. 1 a box type game call 2 is shown, such as used to call turkeys. The call 2 is constructed of a handheld box or base piece 4 and a mating paddle or striker piece 6. The striker piece 6 is interchangeably and pivotally supported to the box piece 4 at a pivot post 8.

The striker piece 6 includes a keyway 10 having an aperture or bore 12 that is coupled to an adjoining countersunk bore 14 via a channel way or slot 16. The striker 6 is secured to the box piece 4 by mounting the pivot appendage or post 8 (e.g. screw fastener) through the bore 12. The pivot post 8 is manipulated along the channel or passage way 16 to the bore 14. A flanged or conical head 18 of the post 8 mounts and is captured in a mating recessed tapered portion 20 of the bore 14. The keyway 10 permits the selective attachment and detachment of the striker 6 from the box piece 4 as well as a variety of other strikers 6 having preferred characteristics and discussed below.

A spring 22 and washer 24 resiliently bias the striker piece 6 to the post 8. The striker piece 6 is resiliently biased to capture the fastener head 18 to the recess 20. The striker 6 can be pivoted to engage and vibrate a sound board surface 26 of the box piece 4. The sound board surface 26 typically comprises a peripheral edge of a longitudinal wall of the box piece 4. The upward force of the spring 22 against the washer 24 and striker 6 is sufficient to prevent release of the striker 6 during normal sound producing manipulations of the striker 6. During normal use, the cooperating surfaces of the striker 6 and box piece 4 are coated with a chalk to produce a rasping sound.

Figure 2A:
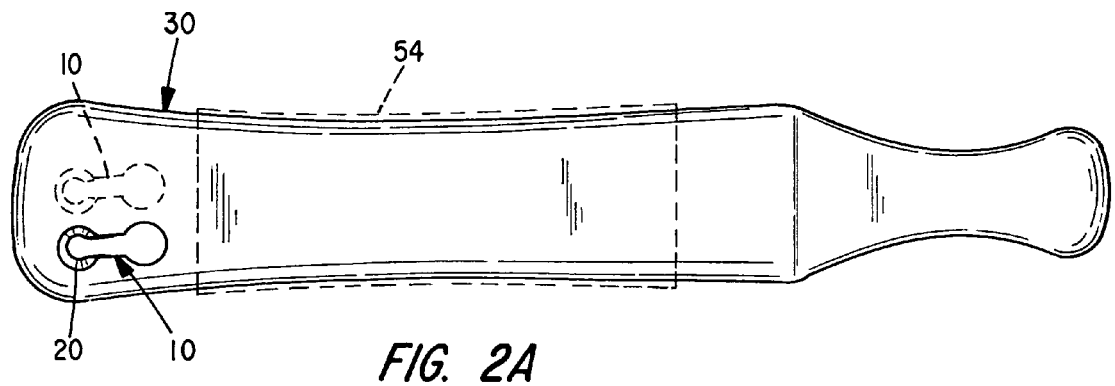
FIGS. 2A, 2B and 2C show strikers exhibiting different longitudinal shapes.
Figure 2B:
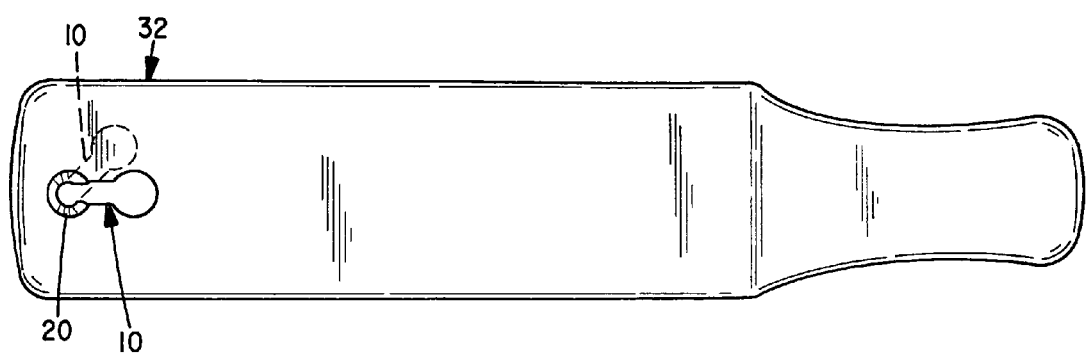
Figure 2C:
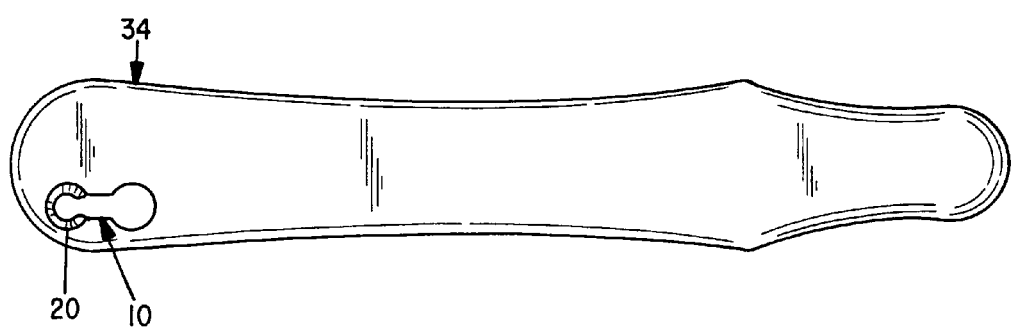
Figure 3A:
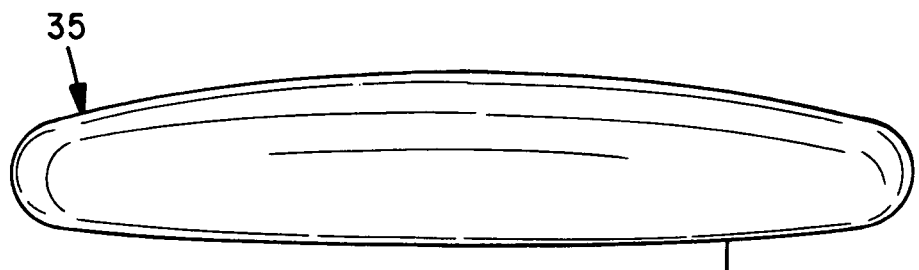
FIGS. 3A, 3B and 3C show strikers exhibiting end view profiles to different lower surfaces that cooperate with vibrating sound board surfaces of the box piece.
Figure 3B:
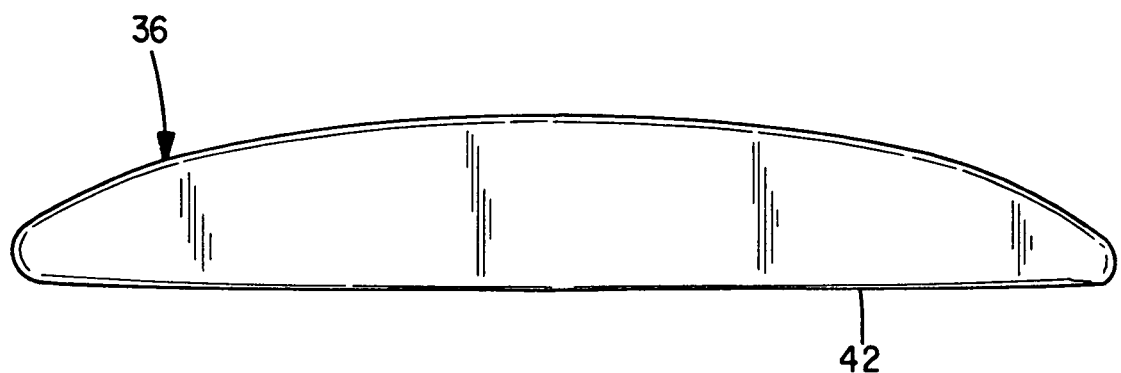
Figure 3C:
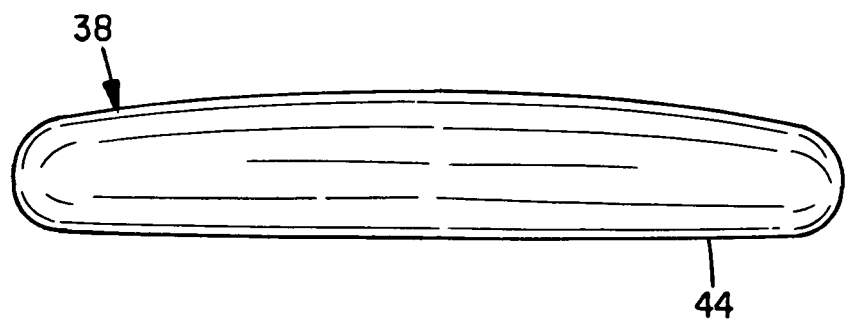
Figure 4:
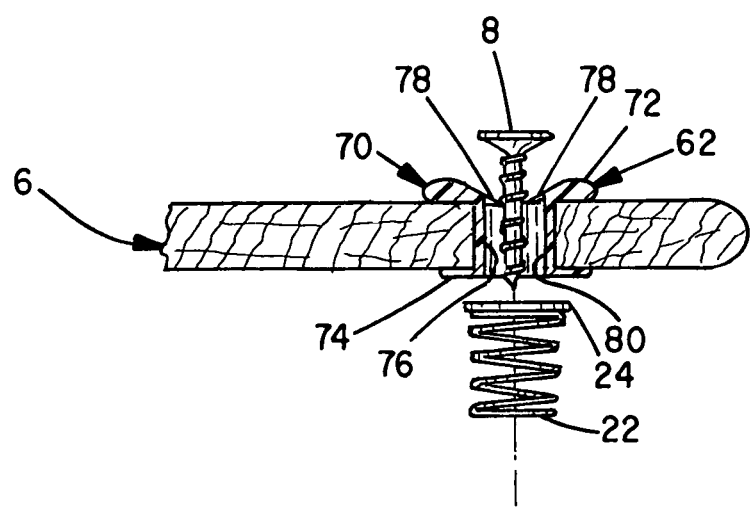
FIG. 4 shows a cross section view through a striker having a resilient bushing that bi-directionally flexes to attach and detach the striker from the mating striker pivot post.
Figure 4A:
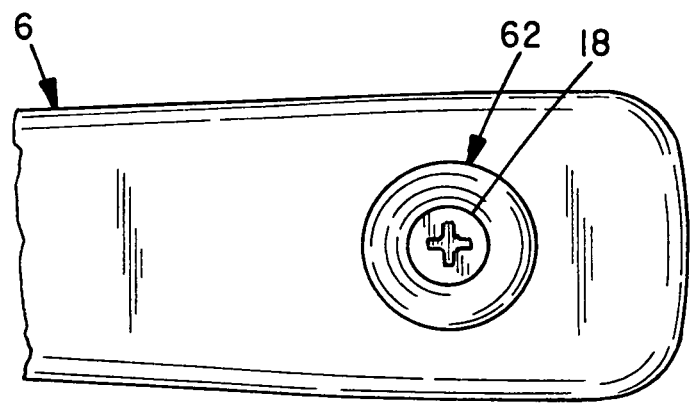
FIG. 4A shows a top view of the pivot post mounted to the bushing of FIG. 4.

FIGS. 2A, 2B and 2C show several striker pieces 30, 32 and 34 that exhibit different longitudinal geometric configurations. FIGS. 3A, 3B and 3C show several other striker pieces 35, 36 and 38 that exhibit different end profiles. That is the curvature of the lower surfaces 40, 42 and 44 that interact with the sound board surface 26 of the box piece 4 exhibit different contoured shapes. Selective variations in shape at the lateral sides of a striker 6 and contour of the lower sound surface produce different sounds when the strikers 30-38 are manipulated over the chalked sound board 26 of the box piece 4. It is to be appreciated the different longitudinal and end profile shapes of the striker of FIGS. 2A, 2B and 2C and FIGS. 3A, 3B and 3C can be adapted into a variety of different strikers to produce a wide variety of sounds. Constructing the strikers 30-38 from different materials and/or coating the surfaces 40, 42 and 44 can also affect the sounds produced. Most significantly the strikers 30-38 can be adapted in modular fashion to a single box piece 4.

The box piece 4 presently supports a striker pivot post 8 that is fashioned from a threaded fastener. The box piece 4 is constructed of wood and provides a bottom wall 40. Relatively thick end walls 43 and 45 and relatively thin longitudinal side walls 46 and 48 project from the bottom wall 39 and circumscribe a sound chamber or cavity 47. Longitudinal ribs or ridges 49 extend along the concave outer side walls 46 and 48 of the box piece 4 to facilitate gripping. One or both of the upper exposed edges 50 and 52 of the longitudinal sidewalls 46 and 48 can be shaped and/or tapered to define the desired sound board surface 26. The edges 50 and/or 52 and interact with the lower surface of the striker 6 to vibrate and produce sound that imitates the vocalizations of a turkey. The use of different woods and materials at the sidewalls 46 and 48 and contoured lower surfaces of the several strikers discussed herein produce different sounds when combined with the single box piece 4.

The mounting location and alignment of the pivot post 8 to the box piece 4 and the keyway 10 at any striker 6 can be adjusted as desired. Correspondingly, the location of the keyway 10 and/or multiple keyways 10 can be included at a striker 6. FIGS. 2A and 2B show two versions of keyways 10 in dashed that can be adapted to facilitate multiple pivot angles with a single striker 6. Such variations cause the striker 6 to engage the sound producing edges 50 and 52 of the box piece 4 at different angular orientations through each stroke to create different sounds, inflections and cadences. Although a spring 22 and washer 24 are used to bias the striker 6, a variety of different resilient materials, for example elastomers of suitable durometers and density might be used (e.g. a tubular rubber or nylon bushing).

The striker 6 and/or box edges 50 and 52 are typically coated with a chalk to enhance friction and induce wall vibration. Alternatively, the striker 6 and/or box edges 50 and 52 can be treated or covered with materials that enhance friction. FIG. 2A depicts in dashed line the striker 30 covered with a waterproof material 54 that protects the striker 30 against moisture yet induces vibration in high humidity and wet conditions. The waterproofing material 54 can be wrapped, laminated or coated to the striker 30 to enhance friction and provide waterproofing. Different materials ranging from wood to plastic to graphite to polycarbonates to glass type composites and laminates can be judiciously utilized during the construction of any striker 6 and/or box piece 4 to produce a variety of sounds.

The subject invention advantageously permits field interchanging the striker pieces 6 (i.e. without removing the pivot post 8) in an efficacious manner. The ability to readily change the striker piece 6 enhances a hunter's ability to produce different sounds with a single box piece 4 to entice a turkey into shooting range. Damaged call pieces can also be readily changed or replaced to extend the life of a call.

Figure 5:
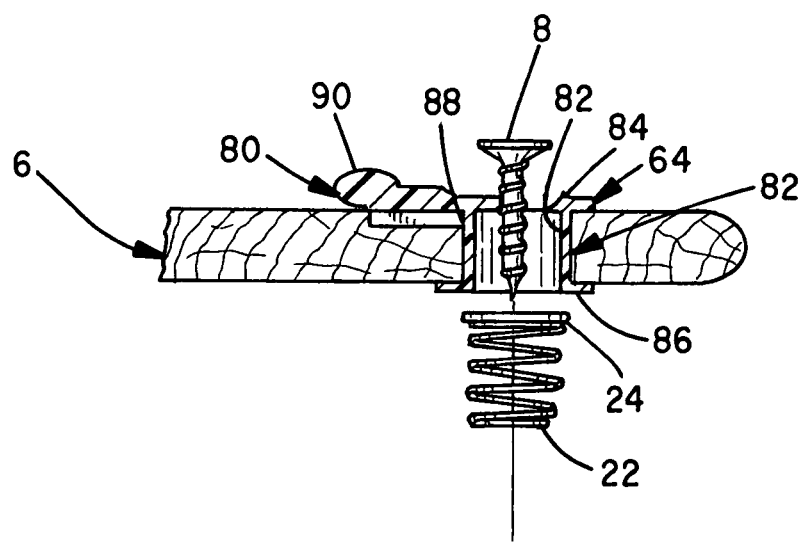
FIG. 5 shows a cross section view through a striker having a reciprocating retainer clip that includes a collar piece that attaches and detaches the striker from the mating striker pivot post.
Figure 5A:
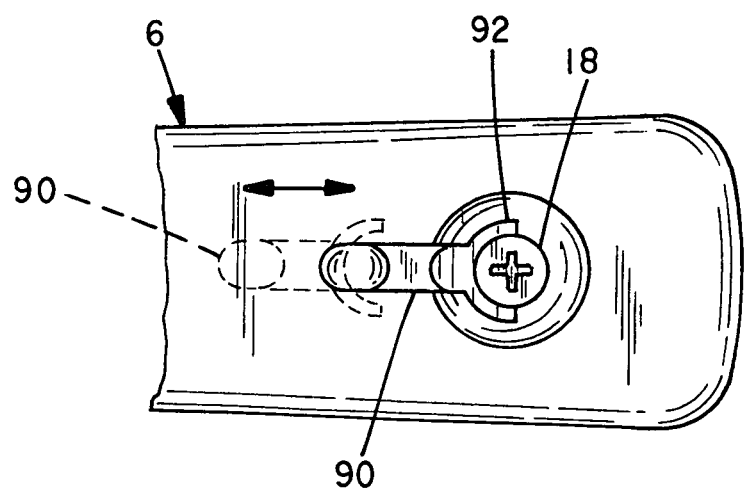
FIG. 5A shows a top view of the pivot post mounted to the collared slide retainer of FIG. 5 and wherein the retainer is shown in solid line in a latched condition and in dashed line in an unlatched condition.

In lieu of using a keyway 10 at a striker piece 6, FIGS. 4 and 4A and 5 and 5A depict alternative resilient retainers 62 and 64 that interchangeably secure a striker 6 to a suitable box piece 4. The retainer 62 shown in cross section at FIG. 5 and in top plan view at FIG. 5A depicts a deformable, tubular bushing 70 having flanged end pieces 72 and 74 that radiate from opposite ends of an intermediate tubular sleeve piece 76. Upon deforming the end flange 74 and press fitting the sleeve 76 through an aperture at the striker 6, the deformed flange piece 72 re-expands to secure the bushing 70 to the striker 6.

Appendages 78 (e.g. an annular rib or flexible projections) extend into a bore 80 of the tubular sleeve piece 76 and are constructed to deform upon passage of the pivot post head 18 past the appendages 78. Once the pivot post head 18 is depressed past the appendages 78, the appendages 78 re-expand to restrain the striker 6 to the box piece 4 with the spring 22 and washer 24 biasing appendages 78 against the pivot post head 18 and securing the striker 6 to the box 4. The bushing material is selected and the appendages 78 are constructed to permit mounting and removal of the striker 6 as desired without removing the pivot post 8.

The retainer 64 shown at FIGS. 5 and 5A provides a multi-piece bushing assembly 80. A body or sleeve piece 82 provides end flanges 84 and 86 that radiate from the intermediate, tubular sleeve piece 82. A groove or shaped surface 88 at an exposed portion of the upper flange 84 mates with a slide mounted clip or collar piece 90. Upon fitting the striker 6 over the pivot post 8, a C-shaped end collar 92 of the clip 90 is manipulated to partially circumscribe the underside of the pivot post head 18 and capture the striker 6 to the pivot post 8. The spring 22 and washer 24 bias the striker 6 as before. The striker 6 is readily removed by merely sliding the collar 92 of the clip piece 90 to the left as shown in dashed line at FIG. 5A to release the end collar 92 from beneath the pivot post head 18. The striker 6 can then be lifted over the pivot post head 18 and released from the box piece 4 and another striker 6 can be mounted.

While the invention has been described with respect to alternative constructions and assemblies and several considered improvements and modifications, still other constructions of the invention can be developed. The scope of the invention should therefore be construed broadly within the spirit and scope of the following claims.

What is claimed is:

1. A game call comprising:
   a) a box piece including a bottom wall and a plurality of side walls that project from the bottom wall to circumscribe an open-sided cavity space and wherein at least one exposed edge of one of said side walls is shaped to vibrate and produce sound;
   b) a post projecting from said box piece and having a head piece that radially projects from said post; and
   c) a striker piece including a keyway comprising an aperture having a bore and a channel way communicating between said bore and a recess in an upper surface of said striker piece, wherein said bore exhibits a diameter that permits said striker piece to mount over said head piece and said head piece to completely pass through said striker piece, and wherein said recess is sized to contain said head piece, whereby said striker piece is secured to said box by extending said head piece through said bore and manipulating said post along said channel way to nest said head piece into said recess where the striker piece can pivot about said post to contact the exposed edge of said side wall and the striker piece is detached from the box piece by re-aligning said head piece to said bore and withdrawing said head piece through said bore without ever removing said post from said box piece.

2. A game call as set forth in claim 1 including means for biasing said head piece to nest into said recess.

3. A game call as set forth in claim 2 wherein said biasing means comprises a spring and washer mounted to said post between said box and striker pieces.

4. A game call as set forth in claim 2 wherein said biasing means comprises an elastomer bushing mounted to said post between said box piece and striker piece.

5. A game call as set forth in claim 1 including a striker piece having a plurality of said keyways whereby the striker piece can be mounted to the box piece to define a plurality of different angular orientations relative to the exposed edge of said side wall to produce different sounds with a single striker piece.

6. A game call as set forth in claim 1 wherein said striker piece is constructed of a waterproof material.

7. A game call comprising:
   a) a box piece including a bottom wall and a plurality of side walls that project from the bottom wall to circumscribe an open-sided cavity space and wherein at least one exposed edge of one of said side walls is shaped to vibrate and produce sound;
   b) a post projecting from said box piece and having a head piece that radially projects from said post; and
   c) a striker piece having a striker bore that communicates between upper and lower surfaces and including a tubular bushing comprising first and second flanged ends that radiate from opposite ends of an intermediate sleeve piece having a sleeve bore, wherein said sleeve piece mounts through the striker bore such that said first and second flanges mount adjacent the upper and lower surfaces of said striker piece, wherein the sleeve bore exhibits a diameter that permits said head piece to completely pass through the sleeve bore and the striker piece, wherein a deformable projection radiates from the sleeve bore that flexes to capture said striker to said post and permit said striker to pivot about said post and contact the exposed edge of said side wall to produce sound, whereby said striker is secured and detached from said box piece upon passing the head piece through said striker without removing said post from said box piece.

8. A game call comprising:
   a) a box piece including a bottom wall and a plurality of side walls that project from the bottom wall to circumscribe an open-sided cavity space and wherein at least one exposed edge of one of said side walls is shaped to vibrate and produce sound;

b) a post projecting from said box piece and having a head piece that radially projects from said post; and c) a striker piece having a striker bore that communicates between upper and lower surfaces and including a tubular bushing comprising first and second flanged ends that radiate from opposite ends of an intermediate sleeve piece having a sleeve bore and a collar piece coupled to cooperate with the first flanged end, wherein said sleeve piece mounts through the striker bore such that the first and second flanged ends respectively mount adjacent the upper and lower surfaces of said striker piece, wherein the sleeve bore exhibits a diameter that permits said head piece to completely pass through the sleeve bore and the collar piece to capture said head piece and secure said striker to said post and permit said striker to pivot about said post and contact the exposed edge of said side wall to produce sound, whereby said striker is secured and detached from said box piece upon passing the head piece through said striker without removing said post from said box piece.

9. A game call as set forth in claim 7 including biasing means mounted between said striker and base pieces for resiliently supporting said striker piece to said box piece.

10. A game call as set forth in claim 9 wherein said biasing means comprises a spring and washer mounted to said post between said box and striker pieces.

* * * * *

UNITED STATES PATENT AND TRADEMARK OFFICE
CERTIFICATE OF CORRECTION

| | | |
|---|---|---|
| PATENT NO. | : 8,535,112 B2 | Page 1 of 1 |
| APPLICATION NO. | : 12/930533 | |
| DATED | : September 17, 2013 | |
| INVENTOR(S) | : Michael Dukart | |

It is certified that error appears in the above-identified patent and that said Letters Patent is hereby corrected as shown below:

In the Specification

Column 4, line 34

The word "striker" should be deleted

Signed and Sealed this
Fifth Day of November, 2013

Teresa Stanek Rea
*Deputy Director of the United States Patent and Trademark Office*